US010437744B2

(12) United States Patent
Song et al.

(10) Patent No.: US 10,437,744 B2
(45) Date of Patent: Oct. 8, 2019

(54) RECONFIGURABLE CAMERA SERIAL INTERFACE

(71) Applicant: Intel Corporation, Santa Clara, CA (US)

(72) Inventors: Hongjiang Song, Mesa, AZ (US); Mahender R Voruganti, Chandler, AZ (US); Girish Ramanathan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/844,966

(22) Filed: Dec. 18, 2017

(65) Prior Publication Data

US 2019/0188159 A1  Jun. 20, 2019

(51) Int. Cl.
  *G06F 13/40* (2006.01)
  *G06F 13/10* (2006.01)
  *G06F 13/42* (2006.01)
  *G06F 13/20* (2006.01)

(52) U.S. Cl.
  CPC ............ *G06F 13/102* (2013.01); *G06F 13/20* (2013.01); *G06F 13/4068* (2013.01); *G06F 13/42* (2013.01)

(58) Field of Classification Search
  CPC ... H04L 7/0331; H04L 7/0037; H04L 7/0087; G06F 13/40
  See application file for complete search history.

(56) References Cited

U.S. PATENT DOCUMENTS

| 8,246,666 | B2 * | 8/2012 | Pressler | A61N 5/0621 606/2 |
| 9,735,950 | B1 * | 8/2017 | Liu | H04L 7/0087 |
| 9,742,413 | B2 * | 8/2017 | Yoshizawa | H03L 7/0816 |
| 9,959,805 | B2 * | 5/2018 | Itoigawa | H03L 7/00 |
| 10,033,519 | B2 * | 7/2018 | Duan | H04L 7/0012 |
| 2014/0281108 | A1 | 9/2014 | Pethe | |
| 2014/0368667 | A1 * | 12/2014 | Peterson | H04L 7/10 348/187 |
| 2015/0009095 | A1 | 1/2015 | Dai et al. | |
| 2015/0280896 | A1 * | 10/2015 | Kil | H04L 7/033 375/362 |
| 2017/0039163 | A1 | 2/2017 | Sejpal et al. | |

(Continued)

FOREIGN PATENT DOCUMENTS

| WO | 2015179546 | 11/2015 |
| WO | 2016191437 | 12/2016 |

OTHER PUBLICATIONS

"International Application Serial No. PCT US2018 063347, International Search Report dated Mar. 22, 2019", 3 pgs.

(Continued)

*Primary Examiner* — Brian T Misiura
(74) *Attorney, Agent, or Firm* — Schwegman Lundberg & Woessner, P.A.

(57) ABSTRACT

Some embodiments include apparatuses and methods using the apparatuses. Some of the apparatuses include a circuit structure that can be configured to operate in either the C-PHY mode or the D-PHY mode of the MIPI specification. In one device, the circuit structure can be included in a receiver of the device and configured to operate in the C-PHY mode. In another device, the circuit structure can be included in a receiver of the device and configured to operate in the D-PHY mode.

19 Claims, 9 Drawing Sheets

(56) References Cited

U.S. PATENT DOCUMENTS

2017/0286327 A1* 10/2017 Zhang ................. G06F 13/4068
2018/0019863 A1* 1/2018 Liao ..................... H04L 7/0087
2018/0241382 A1* 8/2018 Wang ..................... H04L 25/00
2018/0323952 A1* 11/2018 Chang ..................... H03K 5/14

OTHER PUBLICATIONS

"International Application Serial No. PCT US2018 063347, Written Opinion dated Mar. 22, 2019", 6 pgs.

* cited by examiner

RECONFIGURABLE CAMERA SERIAL INTERFACE

TECHNICAL FIELD

Embodiments described herein pertain to communication between devices in electronic systems. Some embodiments relate to communication between camera interfaces and other devices.

BACKGROUND

The mobile device industry has traditionally used a standard interface to attach camera subsystems to a host device. An example of such a standard interface includes a camera interface based on Mobile Industry Processor Interface (MIPI) specification. A conventional MIPI camera interface is usually designed to operate in a particular mode among several different modes defined by the MIPI specification, such as the C-PHY mode, the D-PHY mode, and the M-PHY mode. Currently, no consensus exists in the industry as to which of these modes to be the preferred mode. Thus, one device (e.g., a host device) may have a camera interface designed to operate based on one mode (e.g., the C-PHY mode) of the MIPI specification, and another device (e.g., a different host device) may have a camera interface designed to operate based on another mode (e.g., the D-PHY mode) of the MIPI specification. In many situations, designing different camera interfaces for different devices to operate at different modes (e.g., the C-PHY and D-PHY modes) of the MIPI specification can be economically disadvantageous and time consuming.

DETAILED DESCRIPTION

The techniques described herein relate to a circuit structure (e.g., combo circuitry) that can be configured to operate in either the C-PHY mode or the D-PHY mode of the MIPI specification. For example, the circuit structure described herein can be included in a receiver of a device (e.g., a host device) and configured to operate in the C-PHY mode. In another example, the circuit structure described herein can also be included in a receiver of another device (e.g., another host device) and configured to operate in the D-PHY mode. The configuration of the circuit structure described herein allows the described techniques to have improvements and benefits over some conventional techniques where different designs are used for the C-PHY and D-PHY modes. Some of the improvements and benefits of the techniques described herein include a configurable camera interface for the C-PHY and D-PHY modes using the same circuit design, a reduction in development cost for camera interfaces operating in the C-PHY and D-PHY modes, and a shorter time-to-market associated with the device that includes the described receiver. Other improvements and benefits of the techniques described herein are discussed below with reference to FIG. 1 through FIG. 13.

Figure 1:
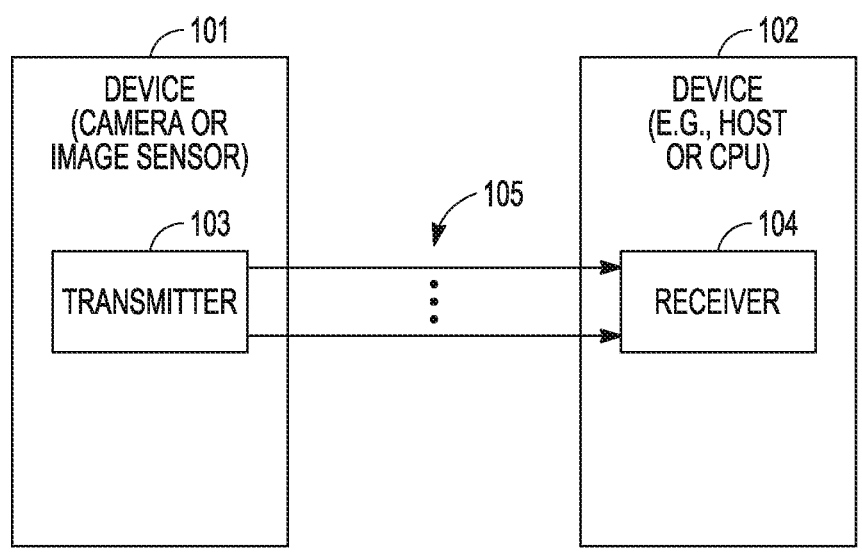
FIG. 1 shows an apparatus including devices and a communication channel coupled to the devices, according to some embodiments described herein.

FIG. 1 shows an apparatus 100 including devices 101 and 102 and a communication channel 105 coupled to devices 101 and 102, according to some embodiments described herein. Device 101 can include an image sensor, a camera, or other devices. Device 102 can include a host processor (e.g., host a central processing unit (CPU)), controller, a system-on-chip (SoC), a computer (e.g., desktop or laptop), a tablet, a mobile device (e.g., a smartphone), and other electronic devices and systems. Communication channel 105 can include conductive paths (e.g., conductive traces on a circuit board).

As shown in FIG. 1, device 101 can include a transmitter 103. Device 102 can include a receiver 104. Transmitter 103 can operate to send information to receiver 104 in the form of signals (e.g., data and clock signals) on communication channel 105. The signals communicated on communication channel 105 can be based on the MIPI specification. For example, signals transmitted by transmitter 103 can be based on the C-PHY mode, D-PHY mode, or M-PHY mode of the MIPI specification.

Thus, in this description, the C-PHY mode and the D-PHY mode refer to the C-PHY mode and the D-PHY mode, respectively, of the MIPI specification. Receiver 104 can be configured to operate in either the C-PHY mode or the D-PHY mode. Receiver 104 can include any of the receivers described below with reference to FIG. 2 through FIG. 14.

Figure 2:
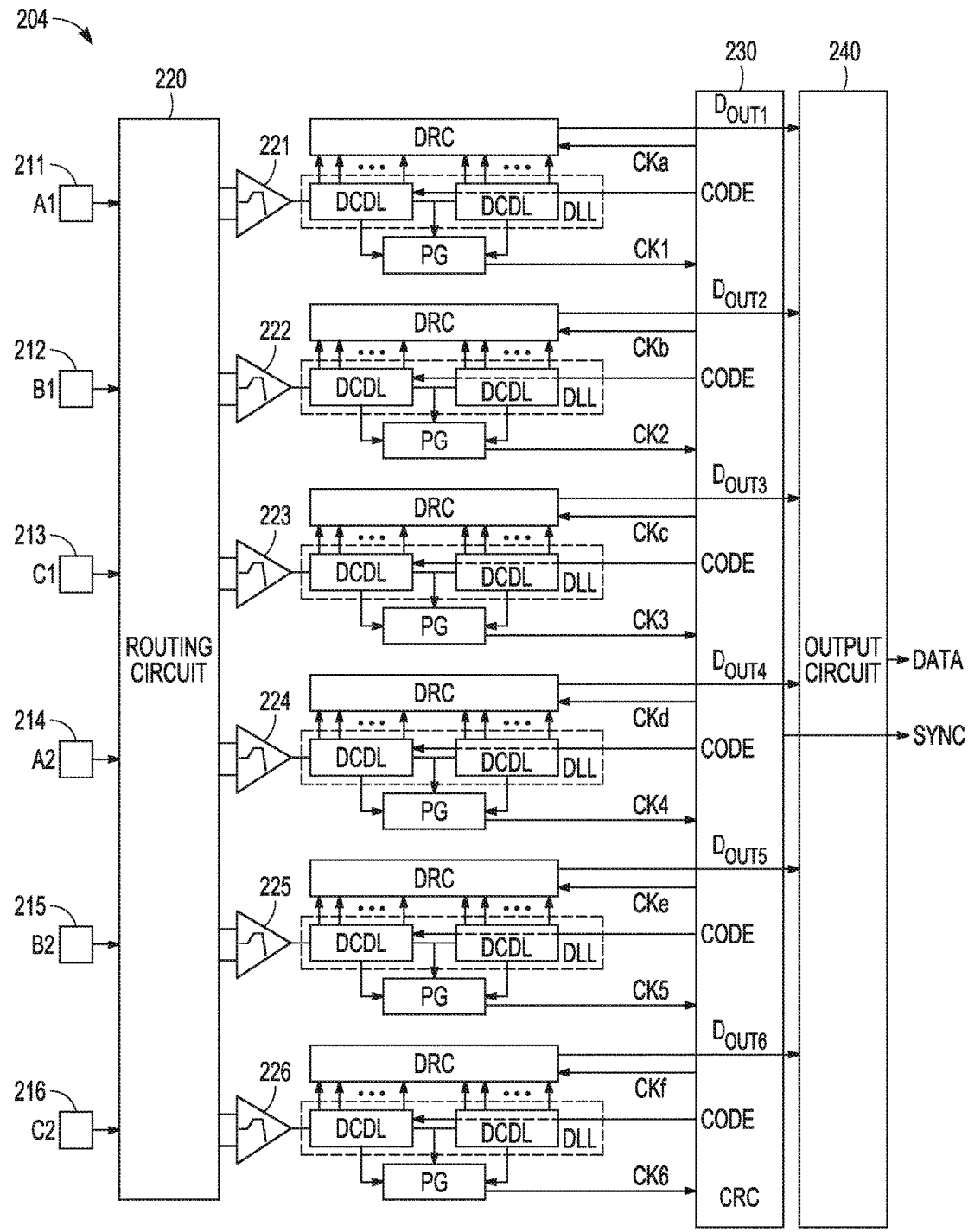
FIG. 2 shows a receiver that can be configured to operate in either C-PHY mode or D-PHY mode, according to some embodiments described herein.

FIG. 2 shows a receiver 204 that can be configured to operate either in C-PHY mode or D-PHY mode, according to some embodiments described herein. As described in more detail below, receiver 204 can be included in a device (e.g., a device similar to device 102 of FIG. 1) and can be configured to operate in the C-PHY mode in such a device.

Receiver 204 can be included in another device (e.g., a device similar to device 102 of FIG. 1) and can be configured to operate in the D-PHY mode in such another device.

As shown in FIG. 2, receiver 204 can include nodes 211 through 216 to receive respective signals A1, B1, C1, A2, B2, and C2. Nodes 211 through 216 can be conductive pads, pins, solder balls, or other conductive connections. Receiver 204 can include a routing circuit (e.g., a multiplexer) 220 and comparators 221 through 226. Each of comparators 221 through 226 can include an amplifier that can operate to receive signals (two signals) at the comparator input nodes and generate an output signal having a level based on the levels (e.g., voltage values) of the input signals at input nodes of the comparator. Routing circuit 220 can be constructed (e.g., can be hard-wired) to include conductive paths coupling nodes 211 through 216 to respective comparators 221 through 226, such that signals A1, B1, C1, A2, B2, and C2 can be appropriately propagated to respective comparators 221 through 226.

Figure 4:
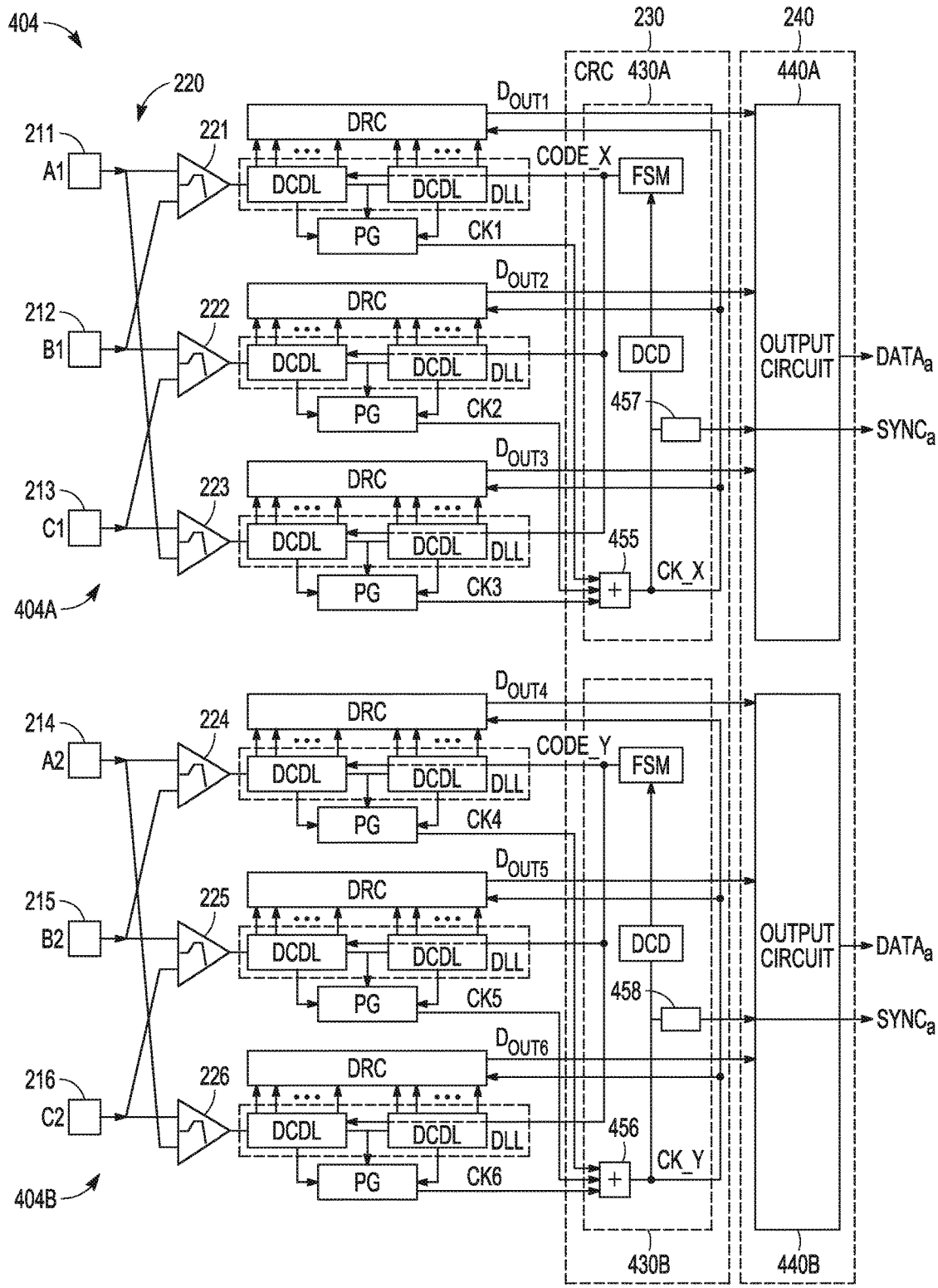
FIG. 4 shows a receiver configured to operate in the C-PHY mode, according to some embodiments described herein.
Figure 8:
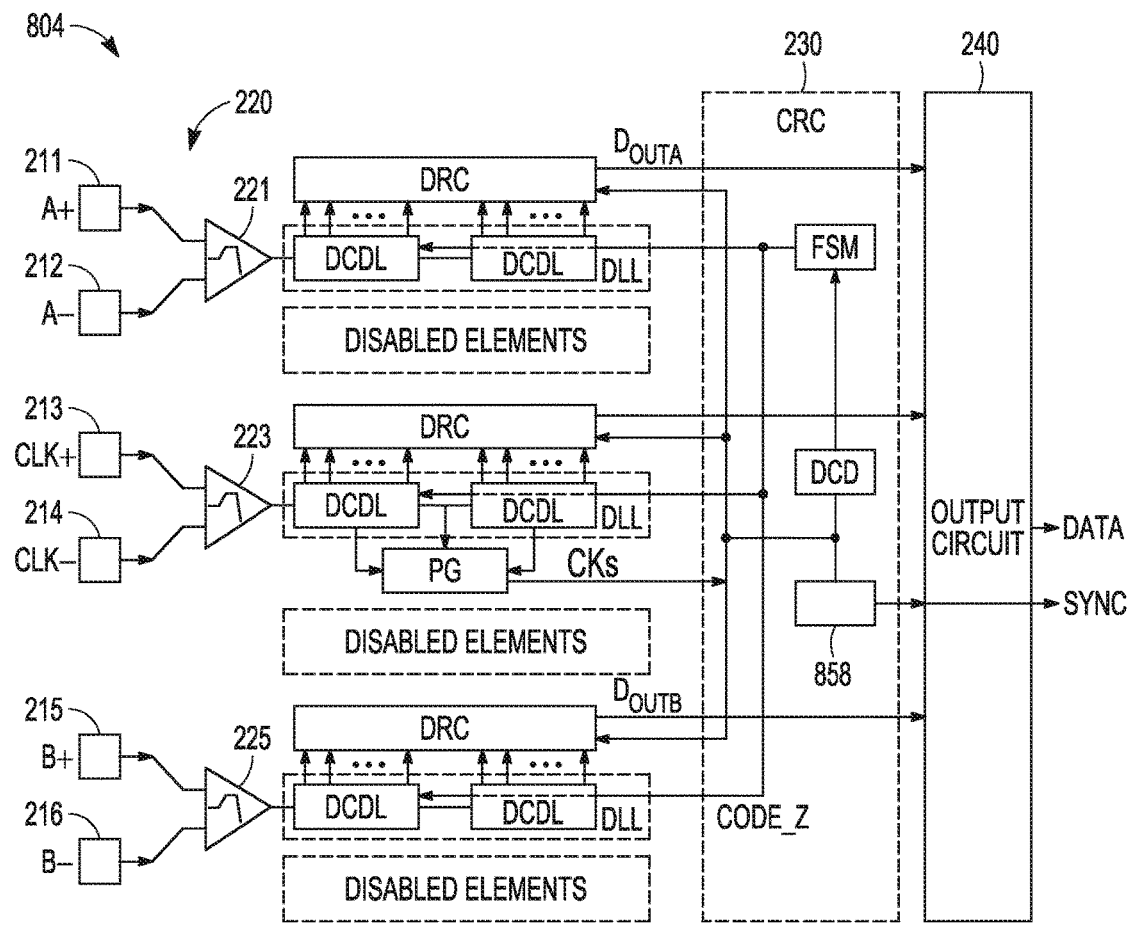
FIG. 8 shows a receiver configured to operate in the D-PHY mode, according to some embodiments described herein.

Routing circuit 220 can have different conductive paths between nodes 211 through 216 and comparators 221 through 226, depending on the mode (e.g., C-PHY mode or D-PHY mode) in which mode receiver 204 is configured (e.g., constructed) to operate. For example, routing circuit 220 can include one set of conductive paths (e.g., as shown in FIG. 4) between nodes 211 through 216 and comparators 221 through 226 if receiver 204 is configured to operate in the C-PHY mode. In another example, routing circuit 220 can include another set of conductive paths (e.g., as shown in FIG. 8) between nodes 211 through 216 and comparators 221 through 226 if receiver 204 is configured to operate in the D-PHY mode. The conductive paths in routing circuit 220 can be fixed (e.g., unchangeable) after receiver 204 is configured to operate in a particular mode (e.g., the C-PHY mode or the D-PHY mode). Thus, a device (e.g., device 102) that includes receiver 204 can receive signals at nodes 211 through 216 based on either the C-PHY mode (if receiver 204 is configured to operate in the C-PHY mode) or the D-PHY mode (if receiver 204 is configured to operate in the D-PHY mode) but not both the C-PHY mode and the D-PHY mode.

Figure 3:
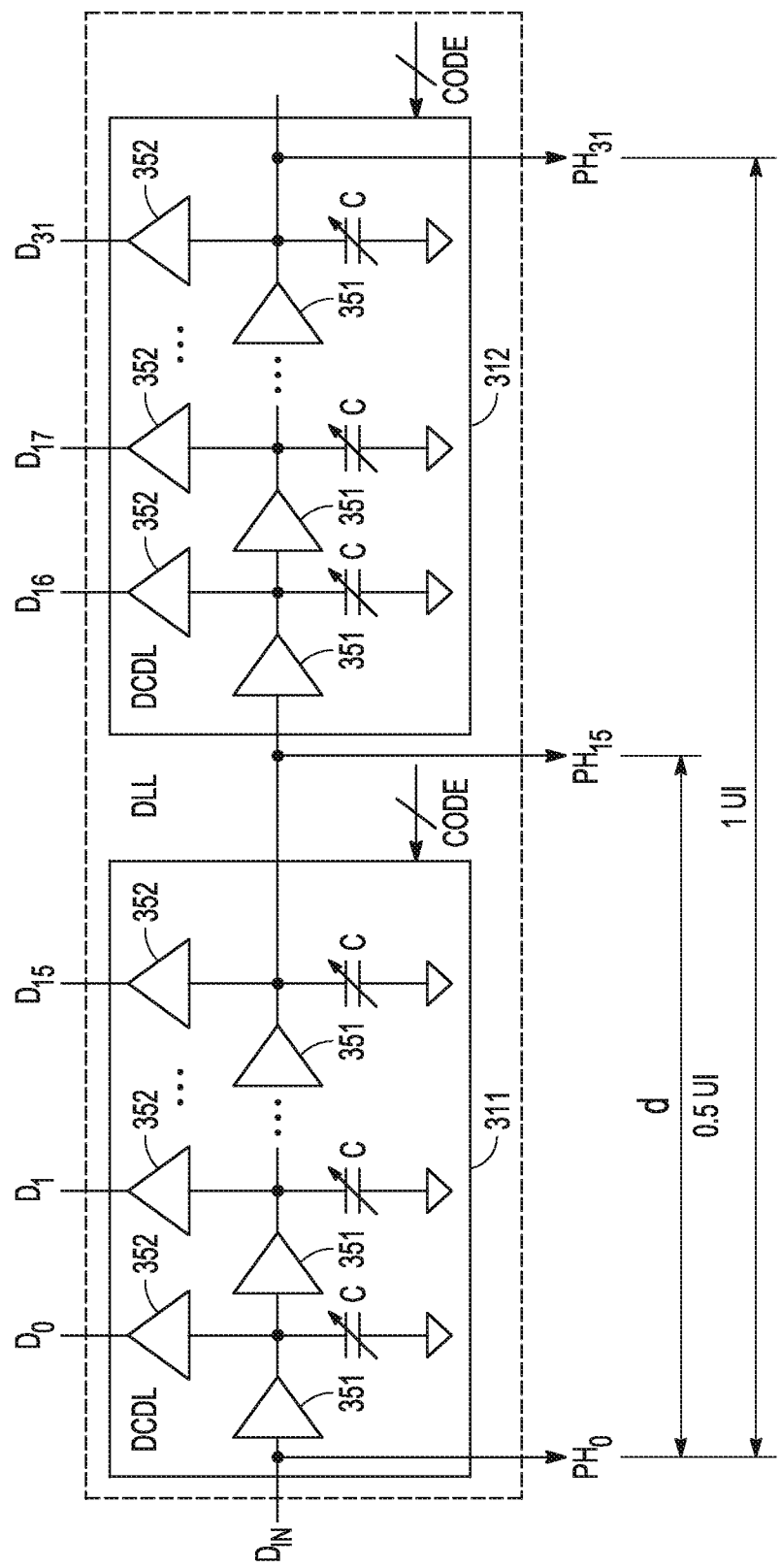
FIG. 3 shows the delay locked-loop (DLL) of the receiver of FIG. 2, according to some embodiments described herein.

As shown in FIG. 2, receiver 204 can include a DLL that can include two series-connected (dual) digital controlled delay line (dual DCDL). The output node of each of comparators 221 through 226 can provide a signal to a respective DLL. Details of the DCDLs of FIG. 2 are shown in FIG. 3. In FIG. 2, each DLL can operate to receive a signal from the output node of a corresponding comparator (one of comparators 221 through 226) and pass the signal through the series-connected DCDLs in that DLL.

Receiver 204 can include a pulse generator (PG) associated with a respective DLL. The PG can generate a clock signal (one of clock signals CK1, CK2, CK3, CK4, CK5, and CK6) based on the signal at the output node of the comparator provided to the DLL associated with the PG.

Receiver 204 can include clock recover circuit (CRC) 230 that can generate clock signals CKa, CKb, CKc, CKd, CKe, and CKf, which can be used as timing signals in the generation of data information (e.g., bits) represented by signals A1, B1, C1, A2, B2, and C2. CRC 230 can also operate to generate information (a digital code) CODE, which can include multiple bits. CRC 230 can use information CODE control (e.g., adjust) the delay (time delay) applied by each DLL to a respective signal passing through the DCDLs of each DLL. As described above, the signal passing through each DLL is the signal from the output node of a respective comparator (one of comparators 221 through 226).

Each of clock signals CK1, CK2, CK3, CK4, CK5, and CK6 can have a duty cycle (e.g., 50% duty cycle) that is configured to operate at a target duty cycle (e.g., a predetermined duty cycle). Controlling the delay of each DLL (using information CODE) allows the duty cycle of each of clock signals CK1, CK2, CK3, CK4, CK5, and CK6 to be at the target duty cycle (e.g., to be within an acceptable range of the duty cycle). CRC 230 can also provide a signal SYNC based on signals CK1, CK2, CK3, CK4, CK5, and CK6. Signal SYNC can be used as a clock signal by the component that receives data information DATA in order to capture information DATA.

Receiver 204 can include a DRC associated with a respective DLL. As shown in FIG. 2, each of the DLLs can include output nodes (e.g., taps) to provide signals (e.g., data signals) to a respective DRC. Each DRC can generate respective data information (e.g., data represented by signals A1, B1, C1, A2, B2, and C2) based on the signals from the output nodes of a respective DLL. The data information generated by each DRC is shown as one of data information Dout1 through Dout6.

Receiver 204 can include an output circuit 240, which can include a serial-in parallel-out (SIPO) circuit to receive data information Dout1 through Dout6 and provide data information DATA (which includes data Dout1 through Dout6) to other components (not shown) coupled to receiver 204. The other components may use data information DATA for further processing.

Thus, as described above, the same structure (e.g., the structure shown in FIG. 2) of receiver 204 can be used to configured receiver 204 to operate in either the C-PHY mode or the D-PHY mode. This flexibility in the configuration allows the structure (e.g., combo PHY circuitry for C-PHY and D-PHY modes using a unified design) of receiver 204 to have benefits and improvements over some conventional receivers. For example, the structure of receiver 204 can provide a configurable camera interface for C-PHY mode and D-PHY mode using the same circuit design, reduce (e.g., minimize) development cost, and improve time-to-market (e.g., provide a relatively shorter time-to-market) associated with the device (e.g., device 102) that includes receiver 204.

FIG. 3 shows the DLL of receiver 204 of FIG. 2, according to some embodiments described herein. As shown in FIG. 3, the DLL can include DCDL 311 and DCDL 312 that represent the dual DCDLs of each of the DLL of FIG. 2.

Dual DCDLs 311 and 312 can be configured such that receiver 204 can operate in either the C-PHY or the D-PHY mode (using the same structure of receiver 204). DCDLs 311 and 312 can operate to compensate data and clock signal delay variations across process-voltage-temperature (PVT) conditions in the circuit operation associated with receiver 204.

As shown in FIG. 3, each of DCDLs 311 and 312 can include similar elements 351 and 325 and capacitors C. Elements 351 and 352 can include inventors. Capacitors C can be adjustable capacitors. Each of DCDLs 311 and 312 can include a number of delay stages. A delay stage can include one of elements and one of capacitors C. DCDLs 311 and 312 can have the same number of delay stages. As shown in FIG. 3, different nodes of the DLL can be used to provide signals $PH_0$, $PH_{15}$, and $PH_{31}$, and signals $D_0$ through $D_{31}$. Signals $PH_0$, $PH_{15}$, and $PH_{31}$ can be used to generate clock signals CK1, CK2, CK3, CK4, CK5, and CK6 (FIG.

2). Signals (e.g., data signal) $D_0$ through $D_{31}$ can be used to generate data information Dout1 through Dout6. Information CODE can be used to control (e.g., adjust) the capacitance of capacitors, such that the timing (e.g., edges) of signals $PH_0$, $PH_{15}$, and $PH_{31}$ can be adjusted so that the duty cycle of each of CK1, CK2, CK3, CK4, CK5, and CK6 can be at the target duty cycle.

DLL of FIG. 3 can be configured (e.g., structured) such that an edge (e.g., rising edge) of signal $PH_0$ and an edge (e.g., rising edge) of signal $PH_{31}$ can be one unit interval (UI) associated with data information represented by signals A1, B1, C1, A2, B2, and C2. (FIG. 2). The UI described herein refers to data UI associated with data information (e.g., represented by signals A1, B1, C1, A2, B2, and C2) provided to the input nodes of comparators 221 through 226.

In FIG. 3, a delay d (e.g., time delay d) can be set at 0.5 UI (or alternatively between 0.05.UI and 0.6 UI). As described in more detail below, clock recovery for the C-PHY mode of receiver 204 can be based on delay d (e.g., a fixed delay) and the transitions of signals A1, B1, C1, A2, B2, and C2.

The DLL of FIG. 3 can include output nodes (e.g., taps) to provide signals $D_0$ through $D_{31}$, which are different delay versions (e.g., 32 delay versions) of signal Din. Signal Din can represent the signal at the output node of any of comparators 221 through 226 of FIG. 2. Signals $D_0$ through $D_{31}$ can be equally spaced cross one UI that is PVT compensated using dual DCDLs 311 and 312. The UI as shown in FIG. 3 can be equal to one period of the clock signal (e.g., CKa, CKb, CKc, CKd, CKe, and CKf in FIG. 2) that is used as timing signal to generate data information (e.g., Dout1 through Dout6) from the output node of the DRCs of receiver 204 of FIG. 2. Each of the clock signals (e.g., CKa, CKb, CKc, CKd, CKe, and CKf) provided to the DRCs of receiver 204 of FIG. 2, in either the C-PHY mode or the D-PHY mode, can be based on the extraction of a signal (e.g., signal $PH_0$ in FIG. 3) at the input node of DCDL 311 and a signal (e.g., $PH_{15}$ in FIG. 3) at the output node of DCDL 311. FIG. 3 shows an example where the DLL includes 32 output nodes to provide 32 respective signals $D_0$ through $D_{31}$. However, the number of output nodes of the DLL can vary.

FIG. 4 shows a receiver 404 configured to operate in the C-PHY mode, according to some embodiments described herein. Receiver 404 includes the same elements as receiver 204 of FIG. 2. Thus, the description of some of the elements of receiver 404 (that are described with reference to FIG. 2) are omitted from the description of FIG. 4. Differences between FIG. 2 and FIG. 4 include details of routing circuit 220, CRC 230, and output circuit 240 (as shown in FIG. 4).

In FIG. 4, the elements of receiver 404 can be grouped into two portions 404a and 404b. Each of portions 404a and 404b can include similar elements and can operate independent from each other in the C-PHY mode.

Portions 404a and 404b can include CRC 430a and 430b, respectively, which are part of CRC 230 of FIG. 2. Portions 404a and 404b can include output circuits 440a and 440b, respectively, that are part of output circuit 240 of FIG. 2.

As shown in FIG. 4, portion 404a can operate to receive signals A1, B1, and C1 and provide data information DATAa based on signals A1, B1, and C1. Portion 404b can operate to receive signals A2, B2, and C2 and provide data information DATAb based on signals A2, B2, and C2. Information DATAa and DATAb are collectively shown as DATA in FIG. 2.

Routing circuit 220 can include conductive paths that can be connected as shown in FIG. 4, such that each of comparators 221, 222, and 223 of portion 404a can compare a unique pair of signals (two out of six signals) among signals A1, B1, and C1; and each of comparators 224, 225, and 226 of portion 404b can compare a unique pair of signals (two out of six signals) among signals A2, B2, and C2.

As is known to those skilled in the art, the C-PHY mode uses three nodes to carry (e.g., transmit or receive) data and an embedded clock signal. Unlike the D-PHY mode, the clock signal is not sent separately from the data. The embedded clock in the C-PHY mode can be recovered (e.g., generated) based on the transitions (e.g., switching) of the three corresponding signals.

In portion 404a of receiver 404 of FIG. 4, a clock signal CK_X can be generated based on the transition of signals A1, B1, and C1. In the configuration (C-PHY mode) of receiver 404 in FIG. 4, clock signals CKa, CKb, and CKc (shown in FIG. 2 but not shown in FIG. 4) can be the same signal, which is clock signal CK_X shown in FIG. 4. The same signal CK_X can also be provided to the DRCs of portion 404a. Portion 404a can use signal CK_X as a timing signal to generate data information Dout1, Dout2, and Dout3 from signals $D_0$ through $D_3$ (FIG. 3) of respective DLLs in portion 404a. Output circuit 440a of portion 404a can provide information DATAa that includes data information Dout1, Dout2, and Dout3. Output circuit 440a can include a SIPO circuit to receive data information Dout1, Dout2, and Dout3 in a serial fashion and provide data. Dout1, Dout2, and Dout3 (in the form of information DATAa) in a parallel fashion.

As shown in FIG. 4, CDR 430a can include a logic circuit (e.g., a logic OR gate) 455 that can generate signal CK_X based on the combination (e.g., logical OR) of clock signals CK1, CK2, and CK3. CDR 430a can include a circuit 457 to provide signal SYNCa based on clock signal CK_X. Signal SYNCa can be used as a timing signal associated with data information DATAa.

CDR 430a can also include a duty cycle detector (DCD) and a finite state machine (FSM). The FSM can generate information CODE_X (which can include multiple bits) to control (e.g., adjust) the delay (time delay) applied by each DLL in portion 404a. In the configuration (C-PHY mode) of receiver 404 in FIG. 4, information CODE_X represents information CODE (FIG. 2) provided to the DLLs associated with comparators 221, 222, and 223. The DCD of portion 404a of FIG. 4 can operate to compare the duty cycle of clock signal CK_X with a target duty cycle (e.g., 50% duty cycle). Based on the comparison, the FSM can operate to adjust (e.g., increase or decrease) the value of information CODE_X. For example, the FSM can increase the value of information CODE_X when the duty cycle of clock signal CK_X is less than a target duty cycle (e.g., 50% duty cycle) and decrease the value of information CODE_X when the duty cycle of clock signal CK_X is greater than the target duty cycle. This control technique (e.g., adjusting the delay of the DLL) allows the DLLs of portion 404a to scale with data rate and insensitive to PVT conditions.

Portion 404b can operate in ways similar to that of portion 404a. For example, in portion 404b, a clock signal CK_Y can be generated based on the switching of signals A2, B2, and C2. In the configuration (the C-PHY mode) of receiver 404 in FIG. 4, clock signals CKd, CKe, and CKf (shown in FIG. 2 but not shown in FIG. 4) can be the same signal, which is clock signal CK_Y shown in FIG. 4. The same signal CK_Y can be provided to the DRCs of portion 404b to generate data information Dout4, Dout5, and Dout6 from signals $D_0$ through $D_{31}$ (FIG. 3) of respective DLLs in portion 404b. Output circuit 440b of portion 404b can provide information DATAb that includes data information Dout4, Dout5, and Dout6. Output circuit 440b can include a SIPO circuit to receive data information Dout4, Dout5, and Dout6 in a serial fashion and provide data Dout4, Dout5, and Dout6 (in the form of information DATAb) in a parallel fashion.

As shown in FIG. 4, CDR 430b can include a logic circuit (e.g., a logic OR gate) 456 that can generate signal CK_Y based on the combination (e.g., logical OR) of clock signals CK4, CK5, and CK6. CRC 430b can include a circuit 458 to provide signal SYNCb based on clock signal CK_Y. Signal SYNCb can be used as timing signal associated with data information DATAb.

CDR 430b can also include a DCD and a FSM. The FSM of CRD 430b can generate information CODE_Y (which can include multiple bits) to control (e.g., adjust) the delay (time delay) applied by each DLL in portion 404b. In the configuration (the C-PHY mode) of receiver 404 in FIG. 4, information CODE_Y represents information CODE (FIG. 2) provided to the DLLs associated with comparators 224, 225, and 226. The DCD of portion 404b of FIG. 4 can operate to compare the duty cycle of clock signal CK_Y with a target duty cycle (e.g., 50% duty cycle). Based on the comparison, the FSM of portion 404b can operate to adjust (e.g., increase or decrease) the value of information CODE_Y. For example, the FSM of portion 404b can increase the value of information CODE_Y when the duty cycle of clock signal CK_Y is less than a target duty cycle and decrease the value of information CODE_Y when the duty cycle of clock signal CK_Y is greater than a target duty cycle. Like the DLLs of portion 404a, the DLLs of portion 404b can be scaled with data rate and can be insensitive to PVT conditions.

Figure 5:
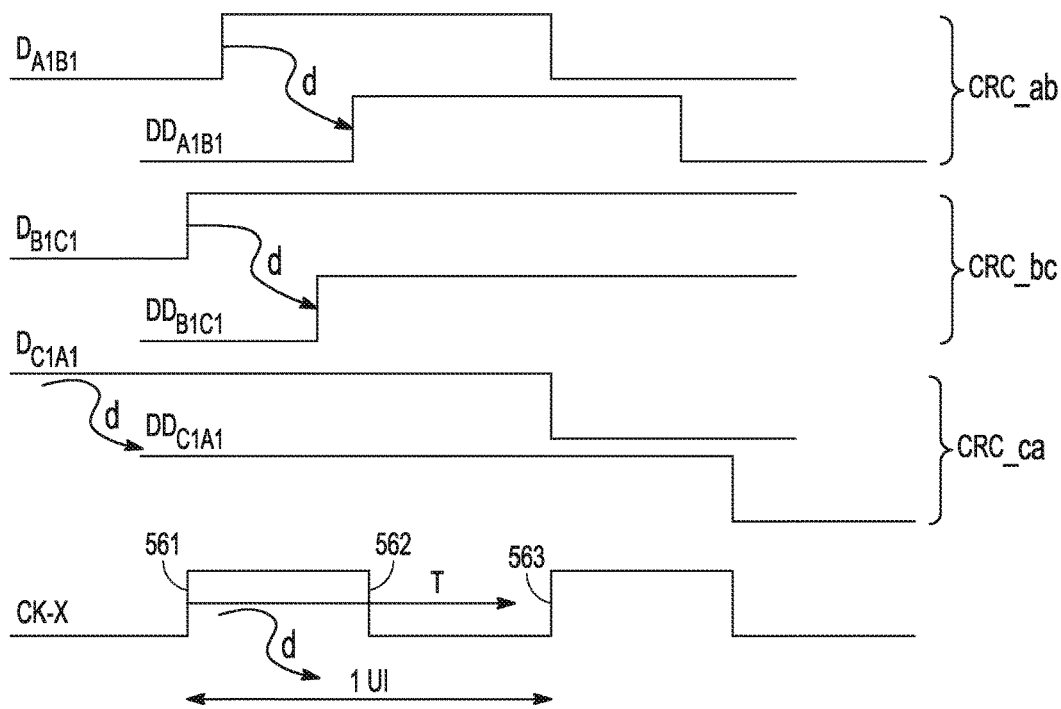
FIG. 5 is a timing diagram showing waveforms of some of the signals of a portion of the receiver of FIG. 4 including a clock signal, according to some embodiments described herein.

FIG. 5 is a timing diagram showing waveforms of some of the signals of portion 404a including clock signal CK_X of FIG. 4, according to some embodiments described herein. In FIG. 5, CRC_ab represents recovery of a clock signal (e.g., CK1 in FIG. 4) based on signals A1 and B1 (e.g., based on the levels of signals A1 and B1) of FIG. 4. CRC_bc represents recovery of a clock signal (e.g., CK2 in FIG. 4) based on signals B1 and C1 (e.g., CK3 in FIG. 4) based on the levels of signals B1 and C1) of FIG. 4. CRC_ca represents recovery of a clock signal based on signals C1 and A1 (e.g., based on the levels of signals C1 and A1). Delay d (time delay d) in FIG. 5 can correspond to delay d shown in FIG. 3.

In FIG. 5, $D_{A1B1}$ is a signal based on the levels of signals A1 and B1. $DD_{A1B1}$ is a delayed version of $D_{A1B1}$. $D_{B1C1}$ is a signal based on the levels of signals B1 and C1. $DD_{B1C1}$ is a delayed version of $D_{B1C1}$. $D_{C1A1}$ is a signal based on the levels of signals C1 and A1. $DD_{C1A1}$ is a delayed version of $D_{C1A1}$. Clock signal CK_X can have a period T, as shown in FIG. 5.

As described above with reference to FIG. 3, delay d can be set (e.g., set from 0.5 UI to 0.6 UI) using DCDL 311. In FIG. 5, the duty cycle of clock signal CK_X can be based on delay d and based on the earliest transition (the first data transition) among the transitions of signals A1, B1, and C1 within a UI. For example, clock signal CK_X can have 50%/duty cycle (or alternatively between 50% and 60% duty cycle) based on delay d and the earliest transition of signals A1, B1, and C1.

Referring to FIG. 4 and FIG. 5, portion 404a (FIG. 4) of receiver 404 includes three comparators 221, 222, and 223 operating in the C-PHY mode to recover the clock signal (e.g., signal CK_X) and compensate for the DCDLs of the DLL across the PVT conditions. In the C-PHY mode, CRC 430a of portion 404a can generate clock signal CK_X that has a rising edge (e.g., edge 561 or edge 563 in FIG. 5) based on the earliest transition of signals A1, B1, and C1. FIG. 5 shows an example where the earliest transition is indicated by signal $D_{B1C1}$ (which is based on the levels of signals B1 and C1 in FIG. 4). Thus, as shown in FIG. 5, edge 561 of clock signal CK_X can be generated based on signal $D_{B1C1}$. The falling edge (e.g., edge 562 in FIG. 5) of clock signal CK_X can be generated based on a fixed delay (e.g., a delay d of from 0.5 to 0.6 UI) from the rising edge (e.g., edge 561 in FIG. 5) of clock signal CK_X.

The DLLs of portion 404a can be structured and controlled (e.g., using information CODE_X), such that clock signal CK_X can be generated to have rising and falling edges based on an earliest transition of signals A1, B1, and C1 and based on delay d (e.g., a fixed delay), respectively. As described above, DCD and FSM of portion 404a can operate to detect the duty-cycle of clock signal CK_X to control the delay of the DLL of portion 404a, such that the delay of the DLL can be locked to a fixed delay (e.g., 0.5 UI o 0.6 UI) of the data LH independent of PVT conditions.

Portion 404b can operate to recover clock signal CK_Y in ways similar to that of portion 404a. Thus, the timing diagram for clock signal CK_Y relative to the levels (e.g., earliest transition) of signals A2, B2, and C2 can be similar to that of the timing diagram for clock signal CK_X of FIG. 5. For simplicity, the timing diagram for clock signal CK_Y is omitted from the description herein.

Generating clock signal CK_X as described above allows receiver 404 to have improvements over some conventional CRC circuits. For example, some conventional CRC circuits may set a delay (e.g., delay d) at a minimal delay (e.g., delay d=0.4 UI) to avoid the glitch in the recovered clock according to a transition jitter specification. However, the recovered clock in the conventional CRC circuits may have a poor clock duty cycle (e.g., 80% duty cycle). Further, when the transition jitter is increased beyond the 0.4 UI due to other receiver circuit non-idealities (e.g., receiver amplifier common mode noise and amplifier bandwidth limitation), such conventional CRC circuits may fail to operate.

In receiver 404, generating clock signal CK_X based on a fixed delay d (e.g., a fixed value from 0.5 UI to 0.6 UI) and based on the earliest data transition (as described above) can provide improvements over some conventional CRC circuits. For example, by using clock signal CK_X generated as described above, the worst case jitter tolerance of receiver 404 may be improved over the conventional CRC circuits. The 50% duty cycle of clock signal CK_X can also make receiver 404 more tolerant for other circuit non-idealities, such as supply noise and mismatches.

Figure 6:
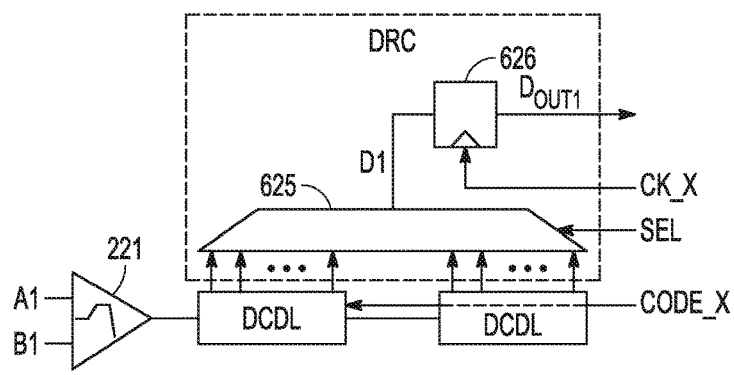
FIG. 6 shows details of a data recovery circuit (DRC) of the receiver of FIG. 4, according to some embodiments described herein.

FIG. 6 shows details of the DRC of the receiver 404 of FIG. 4, according to some embodiments described herein. As shown in FIG. 4, the DRC can include a multiplexor 625 that can respond to select information (e.g., signals) SEL to select one of the signals from the output nodes (e.g., taps) of the DCDLs and pass the selected signal to the output node of multiplexor 625 as data information (e.g., data signal) D1. The DRC can include a sampler (e.g., a flip-flop) 626 to receive (e.g., sample) data information D1 and provide it to the output node of sampler 626 as data information Dout1. The value of information SEL can be selected (e.g., adjusted) to meet the hold time and maximize the setup time of data information D1 relative to the rising edge of clock signal CK_X. The value of information SEL can also be selected to provide an optimal relationship between data information D1 and clock signal CK_X.

Figure 7:
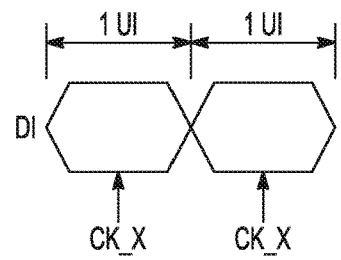
FIG. 7 shows a relationship between a clock signal and data information of the DRC of FIG. 6, according to some embodiments described herein.

FIG. 7 shows a relationship between clock signal CK-_X and data information D1 of the DRC of FIG. 6, according to some embodiments described herein. As shown in FIG. 7, clock signal CK_X can be generated such that clock signal CK_X (e.g., edge 561 in FIG. 5) can be center aligned with the data eye of data information D1. For example, FIG. 7 shows an example of two UIs associated with data information D1, and clock signal CK_Y can be generated (and the value of information SEL (FIG. 6) can be selected), such that clock signal CK_X can be center aligned with the data eye in each UI associated with data information D1.

FIG. 8 shows a receiver 804 configured to operate in the D-PHY mode, according to some embodiments described herein. Receiver 804 includes the same elements as receiver 204 of FIG. 2. Thus, description of some of the elements of receiver 804 (that are described with reference to FIG. 2) are omitted from the description of FIG. 8. Differences between FIG. 2 and FIG. 8 include details of routing circuit 220, CRC 230, and output circuit 240 (as shown in FIG. 8).

In FIG. 8, some of the elements of receiver 804 can be disabled (e.g., to save power) because some of the elements of receiver 204 may be unused (e.g., may not be needed in the D-PHY mode). The disabled elements of receiver 804 are collectively shown in dashed line portions of receiver 804 in FIG. 8. Examples of the disabled elements of receiver 804 can include comparators 222, 224, and 226 (shown in FIG. 2) and the DLLs and PGs (FIG. 2) coupled to comparators 222, 224, and 226, and the PGs coupled to the DLLs associated with respective comparators 221 and 225 (FIG. 8). Further, the DRC (shown in FIG. 8) coupled to the DLL associated with comparator 223 may be unused (e.g., may be disabled) in the D-PHY mode.

As shown in FIG. 8, comparators 221, 223, and 225 can operate to receive respective signals (signal pairs) A+/A− (data signals), CLK+/CLK− (clock signals), and B+/B− (data signals). Receiver 804 can provide data information DATA based on signals A+/A− and B+/B−. Each of signal pairs A+/A−, CLK+/CLK−, and B+/B− can be a differential signal pair. Signals CLK+/CLK− can be source synchronous clock signals provided to receiver 804 along with signals (data signals) A+/A− and B+/B− from a transmitter (e.g., transmitter 103 of FIG. 1).

Routing circuit 220 of receiver 804 can include conductive paths that can be connected in ways shown in FIG. 8, such that each of comparators 221, 223, and 225 can compare signal pairs A+/A−, CLK+/CLK−, and B+/B−, respectively.

As shown in FIG. 8, the PG can generate a clock signal CKs based on signals CLK+ and CLK−. The DRCs (coupled to comparators 221 and 225) can generate (recover) respective data information DoutA and DoutB (from the signals at respective DLLs) based on timing of clock signal CKs.

Output circuit 240 can provide information DATA that includes data information DoutA and DoutB. Output circuit 240 can include a SIPO circuit to receive data information DoutA and DoutB in a serial fashion and provide data DoutA and DoutB (in the form of information DATA) in a parallel fashion.

As shown in FIG. 8, the CDR of receiver 804 can include a DCD and a FSM. The FSM can generate information CODE_Z (which can include multiple bits) to control (e,g., adjust) the delay (time delay) applied by the DLLs of receiver 804. In the configuration (the D-PHY mode) of receiver 804 in FIG. 8, information CODE_Z represents information CODE (FIG. 2) provided to the DLLs associated with comparators 221, 223, and 225. The DCD of receiver 804 in FIG. 8 can operate to compare the duty cycle of clock signal CKs with a target duty cycle (e.g., 50% duty cycle). Based on the comparison, the FSM can operate to adjust (e.g., increase or decrease) the value of information CODE_Z. This control technique allows the DLLs of receiver 804 to scale with data rate and insensitive to PVT conditions.

The CDR of receiver 804 can include a circuit 858 to provide signal SYNC based on clock signal CKs. Signal SYNC can be used as a timing signal associated with data information DATA.

Figure 9:
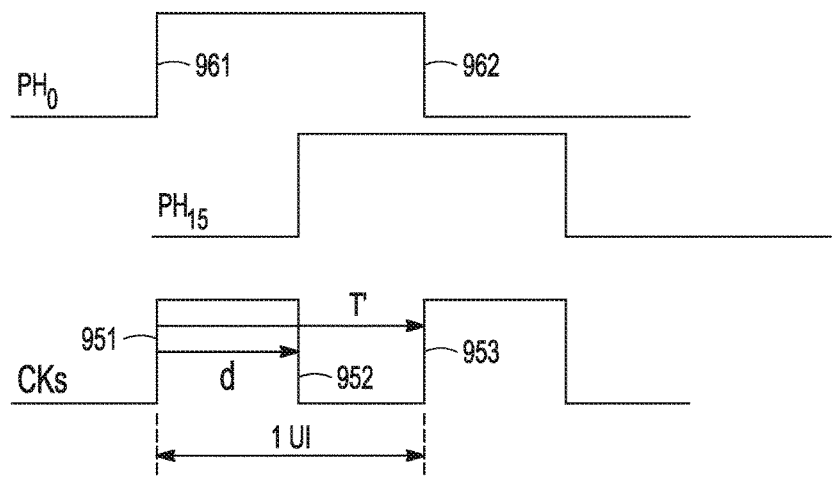
FIG. 9 is a timing diagram showing waveforms of some of the signals of the receiver of FIG. 8 including a clock signal, according to some embodiments described herein.

FIG. 9 is a timing showing waveforms of some of the signals of receiver 804 including clock signal CKs, according to some embodiments described herein. As described above with reference to FIG. 3, delay d can be set (e.g., set from 0.5 UI to 0.6 UI) using DCDL 311. In FIG. 9, the duty cycle of clock signal CKs can be based on delay d. For example, clock signal CKs can have 50% duty cycle (or alternatively between 50% and 60% duty cycle) based on delay d.

As shown in FIG. 9, a rising edge 951 of clock signal CKs can be generated based on a rising edge 961 of signal $PH_0$. A falling edge 952 of clock signal CKs can be generated after a time interval (equal to delay d) has occurred from rising edge 951. A next rising edge 953 of clock signal CKs can be generated based on a falling edge 962 of signal $PH_0$. Clock signal CKs can have a period T', which can be equal to one UI associated with signals A+/A− and B+/B− (FIG. 8).

Figure 10:
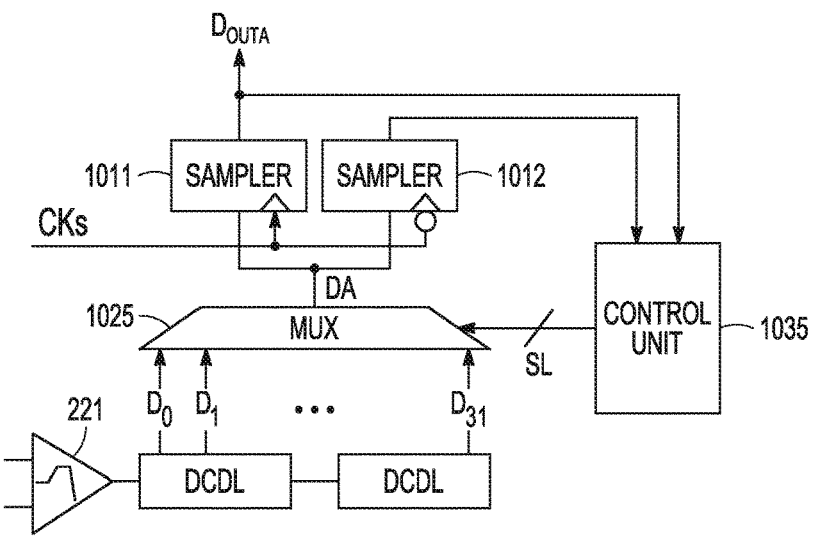
FIG. 10 shows details of a DRC of the receiver of FIG. 8, according to some embodiments described herein.

FIG. 10 shows details of the DRC of the receiver 804 of FIG. 8, according to some embodiments described herein. As shown in FIG. 10, the DRC can include a multiplexor 1025 that can respond to select information (e.g., signals) SL to select one of signals (e.g., one of signals $D_0$ through $D_{31}$ in FIG. 3) from the output nodes (e.g., taps) of the DCDLs and pass the selected signal to the output node of multiplexor 1025 as data information (e.g., data signal) $D_A$. The DRC in FIG. 10 can include samplers 1011 and 1012 that can respond to clock signal CKs to sample data information $D_A$. Information from the output nodes of samplers 1011 and 1012 can be provided to controller 1035. Controller 1035 can include a FSM which can generate select information (e.g., signals) SL based on the information from the output nodes of samplers 1011 and 1012.

Figure 11:
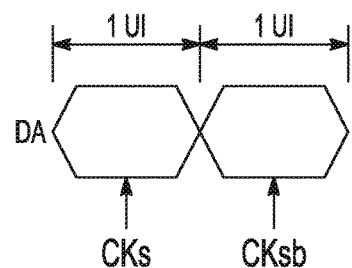
FIG. 11 shows a relationship between a clock signal and data information of the DRC of FIG. 6, according to some embodiments described herein.

FIG. 11 shows a relationship between clock signal CKs and data information $D_A$ of the DRC of FIG. 6, according to some embodiments described herein. As shown in FIG. 11, clock signal CKs can be generated such that an edge (e.g., rising edge) of clock signal CKS can be center aligned with the data eye of data information $D_A$, and an edge (e.g., rising edge) of clock signal CKsb (which is a complement of clock signal CKs) can be aligned at the boundaries between two UIs associated with data information $D_A$.

Figure 12:
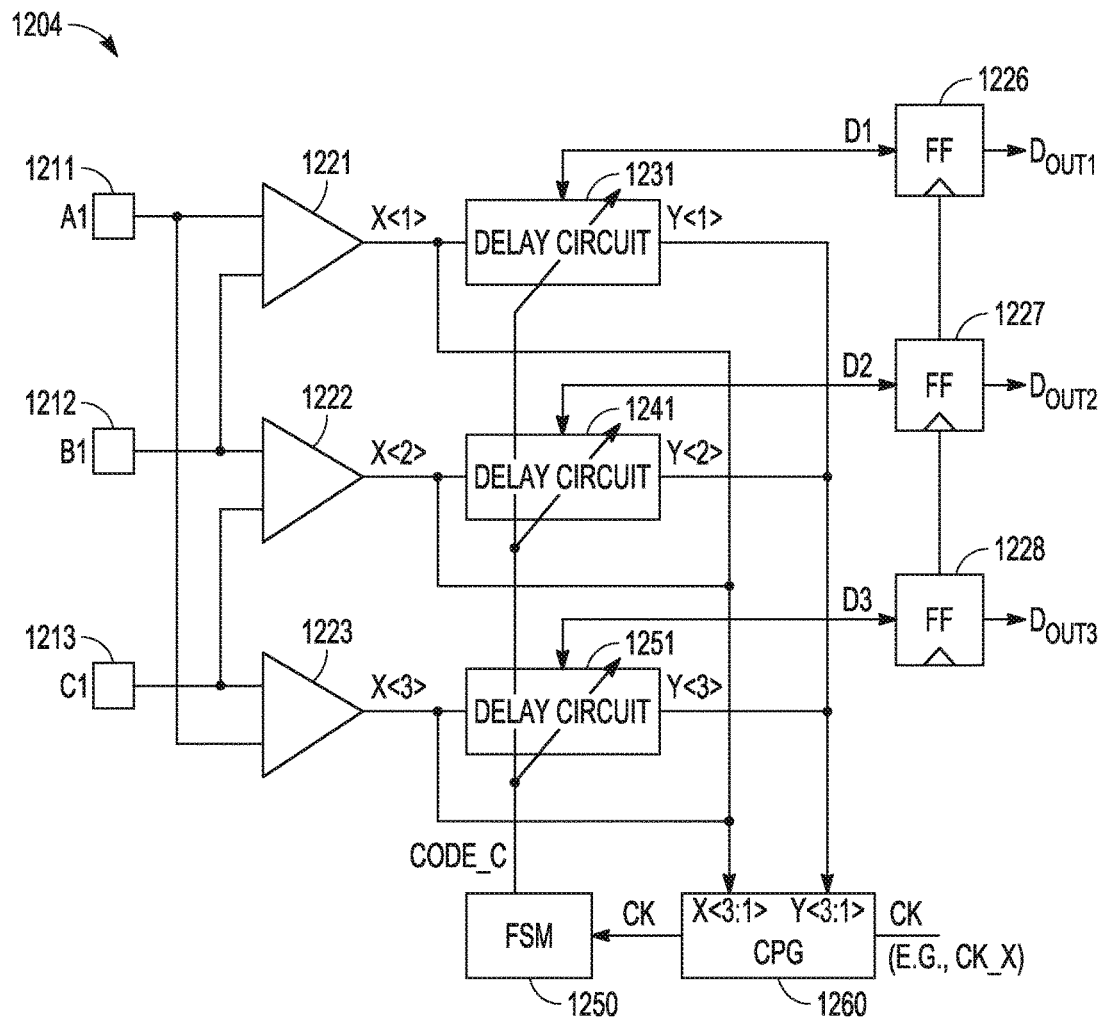
FIG. 12 shows another receiver configured to operate in the C-PHY mode, according to some embodiments described herein.

FIG. 12 shows a receiver 1204 configured to operate in the C-PHY mode, according to some embodiments described herein. Part of receiver 1204 can correspond to part of (e.g., can substitute for part of) receiver 404 of FIG. 4. For example, nodes 1211, 1212, and 1213 (which can receive signals A1, B1, and C1 respectively) of receiver 1204 can correspond to nodes 211, 212, and 213 of receiver 404 of FIG. 4. Comparators 1221, 1222, and 1223 of receiver 1204 can correspond to comparators 221, 222, and 223 of receiver 404 of FIG. 4. Each of delay circuits 1231, 1241, and 1251 of receiver 1204 can correspond to DCDL 311 of FIG. 3, which is one of the dual DCDLs of the DLLs of portion 404a of receiver 404 of FIG. 4. Flip-flop circuit 1226 of receiver 1204 can correspond to sampler 626 (FIG. 6) of the DRC (associated with comparator 221) of portion 404a receiver 404 of FIG. 4. Similarly, flip-flop circuits 1227 and 1228 of receiver 1204 can correspond to respective samplers (not shown in FIG. 4) of the DRCs (associated with comparators 222 and 223) of portion 404a receiver 404 of FIG. 4. Data information Dout1, Dout2, and Dout3 of FIG. 12 can correspond to data information Dout1, Dout2, and Dout3, respectively, of FIG. 4. Data information D1 of FIG. 12 can correspond to data information D1 of FIG. 6. Similarly, data information D2 and D3 of FIG. 12 can correspond to respective data information (not shown in FIG. 4) of the DRCs (associated with comparators 222 and 223) of portion 404a receiver 404 of FIG. 4. Clock signal CK in FIG. 12 can correspond to clock signal CK_X of FIG. 4.

FSM 1250 of receiver 1204 of FIG. 12 can correspond to the FSM of FIG. 4. CPG 1260 of FIG. 12 can correspond to a combination of the PG of FIG. 4 and a portion (e.g., logic circuit 455) of CRC 430a of FIG. 4. CPG 1260 of FIG. 12 can be implemented using a static latch with multiple set (X<3:1>) and reset (Y<3:1>) inputs that can be operated at a relatively high speed (e.g., up to 10 Ghz or higher) and relatively low voltage (e.g., 0.7V or lower).

The generation (e.g., recovery) of clock signal CK can be similar to that of the generation of clock signal CK_X (FIG. 4 and FIG. 5). For example, the duty cycle of clock signal CK can be based on the delay (e.g., delay d) of delay circuit 1231, 1232, and 1233 and the earliest transition of transition of signals A1, B1, and C1.

In operation, the earliest transition (the first data transition among the transitions of signals A1, B1, and C1 within a UI) of the data signal transitions (at X<3:1>) can set the latch in CPG 1260 and generate the rising edge of clock signal CK. A delayed version of the earliest transition (delayed by a corresponding one of delay circuit 1231, 1232, or 1233) can reset the latch in CPG 1260 and generate the falling edge of clock signal CK. Generating clock signal CK as described herein allows receiver 1204 to have improvements over some conventional CRC circuits. Such improvements can be similar to the improvements of receiver 404 described above with reference to FIG. 4 through FIG. 11.

Figure 13:
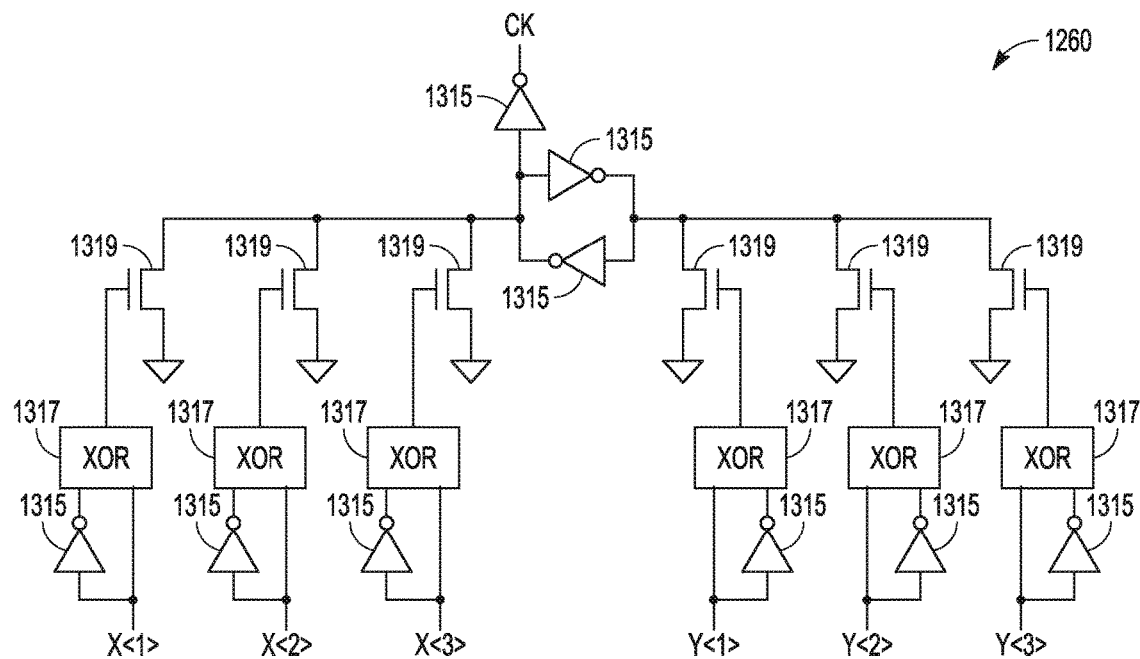
FIG. 13 shows a clock pulse generator (CPG) of the receiver of FIG. 12, according to some embodiments described herein.

FIG. 13 shows CPG 1260 of receiver 1204 of FIG. 12, according to some embodiments described herein. As shown in FIG. 13, CPG 1260 can include inverters 1315, logic circuits (e.g., exclusive OR gates) 1317, and transistors 1319. CPG 1260 can generate the rising edge of signal CK based on signals X<1>, X<2>, and X<3>, and the falling edge of signal CK based on signals Y<1>, Y<2>, and Y<3>.

Referring to FIG. 12 and FIG. 13, FSM 1250 can operate to adjust (e.g., increase or decrease) the value of information CODE_C (which can include multiple bits) to control (e.g., increase or decrease) the delay applied by delay circuits 1231, 1232, and 1233. Information $CODE_{13}$ C can correspond to information CODE of FIG. 3 or information CODEC of FIG. 4. In FIG. 12, as an example, FSM 1250 can increase the value of information CODE_C when the duty cycle of clock signal CK is less than a target duty cycle (e.g., 50% duty cycle) and decrease the value of information CODE_C when the duty cycle of clock signal CK is greater than the target duty cycle. This control technique (e.g., adjusting the delay of the delay circuits 1231, 1232, and 123) allows delay circuits 1231, 1232, and 123 to scale with data rate and insensitive to PVT conditions.

Figure 14:
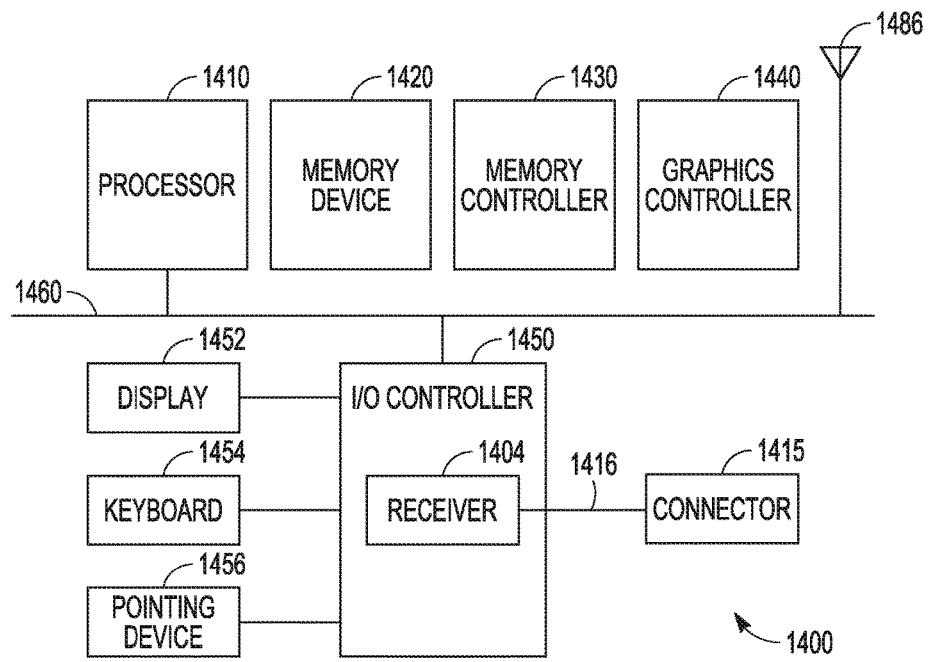
FIG. 14 shows an apparatus in the form of a system (e.g., electronic system), according to some embodiments described herein

FIG. 14 shows an apparatus in the form of a system (e.g., electronic system) 1400, according to some embodiments described herein. System 1400 can include or be included in a computer, a tablet, a mobile device, or other electronic systems. As shown in FIG. 14, system 1400 can include a processor 1410, a memory device 1420, a memory controller 1430, a graphics controller 1440, an input/output (I/O) controller 1450, a display 1452, a keyboard 1454, a pointing device 1456, at least one antenna 1486 a connector 1415, and a bus 1460 (e.g., conductive lines formed on a circuit board (not shown) of system 1400).

Each of processor 1410, memory device 1420, memory controller 1430, graphics controller 1440, and I/O controller 1450 can include an integrated circuit (IC) chip.

In some arrangements, system 1400 does not have to include a display. Thus, display 1452 can be omitted from system 1400. In some arrangements, system 1400 does not have to include any antenna. Thus, antenna 1486 can be omitted from system 1400.

Processor 1410 can include a general-purpose processor or an application specific integrated circuit (ASIC). Processor 1410 can include a central processing unit (CPU).

Memory device 1420 can include a dynamic random access memory (DRAM) device, a static random access memory (SRAM) device, a flash memory device, phase change memory, a combination of these memory devices, or other types of memory. FIG. 14 shows an example where memory device 1420 is a stand-alone memory device separated from processor 1410. In an alternative arrangement, memory device 1420 and processor 1410 can be located on the same die. In such an alternative arrangement, memory device 1420 is an embedded memory in processor 1410, such as embedded. DRAM (eDRAM), embedded SRAM (eSRAM), embedded flash memory, or another type of embedded memory.

Display 1452 can include a liquid crystal display (LCD), a touchscreen (e.g., capacitive or resistive touchscreen), or another type of display. Pointing device 1456 can include a mouse, a stylus, or another type of pointing device.

I/O controller 1450 can include a communication module for wired or wireless communication (e.g., communication through one or more antennas 1458). Such wireless communication may include communication in accordance with WiFi communication technique, Long Term Evolution Advanced (LTE-A) communication technique, or other communication techniques.

I/O controller 1450 can also include a module to allow system 1400 to communicate with other devices or systems in accordance with to one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), Ethernet, MIPI standard, and other specifications.

Connector 1415 may be coupled to I/O controller 1450 through a connection 1416 (e.g., a bus). Connector 1415 can be arranged (e.g., can include terminals, such as pins or pads) to allow system 1400 to be coupled to an external device (or system). Such an external device can include a camera. Connector 1415 can include terminals (e.g., nodes) that can correspond to nodes 211 through 216 (FIG. 4 or FIG. 8) or nodes 1211 through 1213 (FIG. 12) to receive signals from a camera.

As shown in FIG. 14, system 1400 can include a receiver 1404, which can include receiver 404 (FIG. 4), receiver 804 (FIG. 8), or receiver 1204 (FIG. 12). Thus, receiver 1404 can be configured to operate in the C-PHY mode (e.g., if receiver 1404 includes receiver 404 of FIG. 4 or receiver 1204 of FIG. 12) or in the D-PHY mode (e.g., if receiver 1404 includes receiver 804 of FIG. 8).

FIG. 14 shows the elements (e.g., devices and controllers) of system 1400 arranged separately from each other as an example. For example, each of processor 1410, memory device 1420, memory controller 1430, graphics controller 1440, and I/O controller 1450 can be located on a separate IC chip (e.g., separate semiconductor dies). In some arrangements, two or more elements (e.g., processor 1410, memory device 1420, graphics controller 1440, and I/O controller 1450) of system 1400 can be located on the same die (e.g., same IC chip) that can form a system-on-chip.

The illustrations of the apparatuses (e.g., apparatus 100 and system 1400 including receivers 104, 204, 404, and 804) and methods (e.g., operations of apparatus 100 and system 1400 including operations of receivers 104, 204, 404, and 804) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor modules or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 4) players), vehicles, medical devices (e.g., heart monitors, blood pressure monitors, etc.), set top boxes, and others.

ADDITIONAL NOTES AND EXAMPLES

Example 1 includes subject matter (such as a device, an electronic apparatus (e.g., circuit, electronic system, or both), or a machine) including nodes to receive signals based on C-PHY mode of Mobile Industry Processor Interface (MIPI) specification, a first comparator including input nodes coupled to two of the nodes, a second comparator including input nodes coupled to two of the nodes, a third comparator including input nodes coupled to two of the nodes, a first delay locked-loop coupled to an output node of the first comparator, the first delay locked-loop including first and second digital controlled delay lines coupled in series with each other, a second delay locked-loop coupled to an output node of the second comparator, the second delay locked-loop including first and second digital controlled delay lines coupled in series with each other, and a third delay locked-loop coupled to an output node of the third comparator, the third delay locked-loop including first and second digital controlled delay lines coupled in series with each other.

In Example 2, the subject matter of Example 1 may optionally include, further comprising a first data recover circuit coupled to the first delay locked-loop, a second data recover circuit coupled to the second delay locked-loop, a third data recover circuit coupled to the third delay locked-loop, and a clock recovery circuit coupled to the first, second, and third data recover circuits.

In Example 3, the subject matter of Example 1 or 2 may optionally include, wherein the first and second digital controlled delay lines of the first delay locked-loop include a same number of delay stages, the first and second digital controlled delay lines of the second delay locked-loop include a same number of delay stages, and the first and second digital controlled delay lines of the third delay locked-loop include a same number of delay stages.

In Example 4, the subject matter of Example 1 or 2 may optionally include, wherein the first data recover circuit includes a multiplexor coupled to output nodes of the first delay locked-loop, the second data recover circuit includes a multiplexor coupled to output nodes of the second delay locked-loop, and the third data recover circuit includes a multiplexor coupled to output nodes of the third delay locked-loop.

In Example 5, the subject matter of Example 4 may optionally include, wherein the first data recovery circuit includes a data sampler coupled to an output node of the first multiplexor.

In Example 6, the subject matter of Example 2 may optionally include, wherein the clock recovery circuit includes a finite state machine to provide a code to control the first, second, and third delay locked-loops.

In Example 7, the subject matter of Example 6 may optionally include, wherein a value of the code is based on a comparison between a target duty cycle and a duty cycle of a clock signal generated by the clock recovery circuit.

In Example 8, the subject matter of Example 1 may optionally include, further comprising a fourth comparator including input nodes coupled to two of the nodes, a fifth comparator including input nodes coupled to two of the nodes, a sixth comparator including input nodes coupled to two of the nodes, a fourth delay locked-loop coupled to an output node of the fourth comparator, the fourth delay locked-loop including first and second digital controlled delay lines coupled in series with each other, a fifth delay locked-loop coupled to an output node of the fifth comparator, the fifth delay locked-loop including first and second digital controlled delay lines coupled in series with each other, and a sixth delay locked-loop coupled to an output node of the sixth comparator, the sixth delay locked-loop including first and second digital controlled delay lines coupled in series with each other.

In Example 9, the subject matter of Example 8 may optionally include, wherein further comprising a fourth data recover circuit coupled to the fourth delay locked-loop, a fifth data recover circuit coupled to the fifth delay locked-loop, a sixth data recover circuit coupled to the sixth delay locked-loop, and an additional clock recovery circuit coupled to the fourth, fifth, and sixth data recover circuits.

Example 10 includes subject matter (such as a device, an electronic apparatus (e.g., circuit, electronic system, or both), or a machine) including nodes to receive signals based on C-PHY mode of Mobile Industry Processor Interface (MIPI) specification, a first comparator including input nodes coupled to two of the nodes, a second comparator including input nodes coupled to two of the nodes, a third comparator including input nodes coupled to two of the nodes, a first delay circuit coupled to an output node of the first comparator, a second delay circuit coupled to an output node of the second comparator, a third delay circuit coupled to an output node of the third comparator, and a clock recovery circuit to generate a clock signal, the clock signal including a first edge based on an edge of a first signal generated based on an earliest data transition among data transitions of signals received that the nodes, and a second edge based on an edge of a second signal, the second signal being a delayed version of the first signal.

In Example 11, the subject matter of Example 10 may optionally include, wherein each of the first and second delay circuits include a digital controlled delay line.

In Example 12, the subject matter of Example 10 or 11 may optionally include, wherein further comprising a finite state machine to provide a code to adjust a time delay of each of the first and second delay circuits.

In Example 13, the subject matter of Example 10 may optionally include, wherein the first edge of the clock signal is a rising edge and the second edge of the clock signal is a falling edge.

In Example 14, the subject matter of Example 13 may optionally include, wherein the edge of the first signal is a rising edge, and the edge of the second signal is a rising edge.

Example 15 includes subject matter (such as a device, an electronic apparatus (e.g., circuit, electronic system, or both), or a machine) including nodes to receive signals based on D-PHY mode of Mobile industry Processor Interface (MIPI) specification, a first comparator including input nodes coupled to two of the nodes, a second comparator including input nodes coupled to two of the nodes, a third comparator including input nodes coupled to two of the nodes, a first delay locked-loop coupled to an output node of the first comparator, a second delay locked-loop coupled to an output node of the second comparator, a third delay locked-loop coupled to an output node of the third comparator, fifth, fourth, and sixth comparators coupled to fifth, fourth, and sixth delay locked-loop, respectively, and a clock recovery circuit coupled to the first, second, third, fourth; fifth, and sixth delay locked-loops, wherein the fourth, fifth, and sixth comparators and the fourth, fifth, and sixth delay locked-loop are disabled during operations of the first, second, and third comparators and first, second, and third delay locked-loops.

In Example 16, the subject matter of Example 15 may optionally include, wherein the first delay locked-loop including first and second digital controlled delay lines coupled in series with each other, the second delay locked-loop including first and second digital controlled delay lines coupled in series with each other, and the third delay locked-loop including first and second digital controlled delay lines coupled in series with each other.

In Example 17, the subject matter of Example 15 may optionally include, wherein the clock recovery circuit includes a finite state machine to provide a code to control the first and second delay locked-loops.

In Example 18, the subject matter of Example 15 may optionally include, further comprising a multiplexor coupled output nodes of the first delay locked-loop, and a data sampler coupled to an output node of the multiplexor.

Example 19 includes subject matter (such as a device, an electronic apparatus (e.g., circuit, electronic system, or both), or a machine) including a receiver to receive signals based on Mobile Industry Processor Interface (MIPI) specification, a processor to process data information included in the signals, and antenna coupled to the processor, the receiver including a first comparator including input nodes coupled to two of the nodes, a second comparator including input nodes coupled to two of the nodes, a third comparator including input nodes coupled to two of the nodes, a first delay locked-loop coupled to an output node of the first comparator, the first delay locked-loop including first and second digital controlled delay lines coupled in series with each other, a second delay locked-loop coupled to an output node of the second comparator, the second delay locked-loop including first and second digital controlled delay lines coupled in series with each other, and a third delay locked-loop coupled to an output node of the third comparator, the second delay locked-loop including first and second digital controlled delay lines coupled in series with each other.

In Example 20, the subject matter of Example 19 may optionally include, further comprising a fourth comparator including input nodes coupled to two of the nodes, a fifth comparator including input nodes coupled to two of the nodes, a sixth comparator including input nodes coupled to two of the nodes, a fourth delay locked-loop coupled to an output node of the fourth comparator, the fourth delay locked-loop including first and second digital controlled delay lines coupled in series with each other, a fifth delay locked-loop coupled to an output node of the fifth comparator, the fifth delay locked-loop including first and second digital controlled delay lines coupled in series with each other, and a sixth delay, locked-loop coupled to an output node of the sixth comparator, the sixth delay locked-loop including first and second digital controlled delay lines coupled in series with each other.

The subject matter of Example 1 through Example 20 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    nodes to receive signals based on C-PHY mode of Mobile Industry Processor Interface (MIPI) specification;
    a first comparator including input nodes coupled to two of the nodes;
    a second comparator including input nodes coupled to two of the nodes;
    a third comparator including input nodes coupled to two of the nodes;
    a first delay locked-loop coupled to an output node of the first comparator, the first delay locked-loop including first and second digital controlled delay lines coupled in series with each other;
    a second delay locked-loop coupled to an output node of the second comparator, the second delay locked-loop including first and second digital controlled delay lines coupled in series with each other;
    a third delay locked-loop coupled to an output node of the third comparator, the third delay locked-loop including first and second digital controlled delay lines coupled in series with each other; and
    circuitry to provide a code to adjust a time delay of at least one of the first second, and third delay locked-loops.

2. The apparatus of claim 1, further comprising:
    a first data recover circuit coupled to the first delay locked-loop;

a second data recover circuit coupled to the second delay locked-loop;
a third data recover circuit coupled to the third delay locked-loop; and
a clock recovery circuit coupled to the first, second, and third data recover circuits.

3. An apparatus comprising:
nodes to receive signals based on C-PHY mode of Mobile Industry Processor Interface (MIPI) specification;
a first comparator including input nodes coupled to two of the nodes;
a second comparator including input nodes coupled to two of the nodes;
a third comparator including input nodes coupled to two of the nodes;
a first delay locked-loop coupled to an output node of the first comparator, the first delay locked-loop including first and second digital controlled delay lines coupled in series with each other;
a second delay locked-loop coupled to an output node of the second comparator, the second delay locked-loop including first and second digital controlled delay lines coupled in series with each other;
a third delay locked-loop coupled to an output node of the third comparator, the third delay locked-loop including first and second digital controlled delay lines coupled in series with each other;
a first data recover circuit coupled to the first delay locked-loop;
a second data recover circuit coupled to the second delay locked-loop;
a third data recover circuit coupled to the third delay locked-loop; and
a clock recovery circuit coupled to the first, second, and third data recover circuits, wherein:
the first and second digital controlled delay lines of the first delay locked-loop include a same number of delay stages;
the first and second digital controlled delay lines of the second delay locked-loop include a same number of delay stages; and
the first and second digital controlled delay lines of the third delay locked-loop include a same number of delay stages.

4. An apparatus comprising:
nodes to receive signals based on C-PHY mode of Mobile Industry Processor Interface (MIPI) specification;
a first comparator including input nodes coupled to two of the nodes;
a second comparator including input nodes coupled to two of the nodes;
a third comparator including input nodes coupled to two of the nodes;
a first delay locked-loop coupled to an output node of the first comparator, the first delay locked-loop including first and second digital controlled delay lines coupled in series with each other;
a second delay locked-loop coupled to an output node of the second comparator, the second delay locked-loop including first and second digital controlled delay lines coupled in series with each other;
a third delay locked-loop coupled to an output node of the third comparator, the third delay locked-loop including first and second digital controlled delay lines coupled in series with each other;
a first data recover circuit coupled to the first delay locked-loop;
a second data recover circuit coupled to the second delay locked-loop;
a third data recover circuit coupled to the third delay locked-loop; and
a clock recovery circuit coupled to the first, second, and third data recover circuits, wherein:
the first data recover circuit includes a multiplexor coupled to output nodes of the first delay locked-loop;
the second data recover circuit includes a multiplexor coupled to output nodes of the second delay locked-loop; and
the third data recover circuit includes a multiplexor coupled to output nodes of the third delay locked-loop.

5. The apparatus of claim 4, wherein the first data recovery circuit includes a data sampler coupled to an output node of the first multiplexor.

6. An apparatus comprising:
nodes to receive signals based on C-PHY mode of Mobile Industry Processor Interface (MIPI) specification;
a first comparator including input nodes coupled to two of the nodes;
a second comparator including input nodes coupled to two of the nodes;
a third comparator including input nodes coupled to two of the nodes;
a first delay locked-loop coupled to an output node of the first comparator, the first delay locked-loop including first and second digital controlled delay lines coupled in series with each other;
a second delay locked-loop coupled to an output node of the second comparator, the second delay locked-loop including first and second digital controlled delay lines coupled in series with each other;
a third delay locked-loop coupled to an output node of the third comparator, the third delay locked-loop including first and second digital controlled delay lines coupled in series with each other;
a first data recover circuit coupled to the first delay locked-loop;
a second data recover circuit coupled to the second delay locked-loop;
a third data recover circuit coupled to the third delay locked-loop; and
a clock recovery circuit coupled to the first, second, and third data recover circuits, wherein the clock recovery circuit includes a finite state machine to provide a code to control the first, second, and third delay locked-loops.

7. The apparatus of claim 6, wherein a value of the code is based on a comparison between a target duty cycle and a duty cycle of a clock signal generated by the clock recovery circuit.

8. An apparatus comprising:
nodes to receive signals based on C-PHY mode of Mobile Industry Processor Interface (MIPI) specification;
a first comparator including input nodes coupled to two of the nodes;
a second comparator including input nodes coupled to two of the nodes;
a third comparator including input nodes coupled to two of the nodes;
a first delay locked-loop coupled to an output node of the first comparator, the first delay locked-loop including first and second digital controlled delay lines coupled in series with each other;
a second delay locked-loop coupled to an output node of the second comparator, the second delay locked-loop including first and second digital controlled delay lines coupled in series with each other;
a third delay locked-loop coupled to an output node of the third comparator, the third delay locked-loop including first and second digital controlled delay lines coupled in series with each other;
a fourth comparator including input nodes coupled to two of the nodes;
a fifth comparator including input nodes coupled to two of the nodes;
a sixth comparator including input nodes coupled to two of the nodes;
a fourth delay locked-loop coupled to an output node of the fourth comparator, the fourth delay locked-loop including first and second digital controlled delay lines coupled in series with each other;
a fifth delay locked-loop coupled to an output node of the fifth comparator, the fifth delay locked-loop including first and second digital controlled delay lines coupled in series with each other; and
a sixth delay locked-loop coupled to an output node of the sixth comparator, the sixth delay locked-loop including first and second digital controlled delay lines coupled in series with each other.

9. The apparatus of claim 8, further comprising:
a fourth data recover circuit coupled to the fourth delay locked-loop;
a fifth data recover circuit coupled to the fifth delay locked-loop;
a sixth data recover circuit coupled to the sixth delay locked-loop; and
an additional clock recovery circuit coupled to the fourth, fifth, and sixth data recover circuits.

10. An apparatus comprising:
nodes to receive signals based on C-PHY mode of Mobile Industry Processor Interface (MIPI) specification;
a first comparator including input nodes coupled to two of the nodes;
a second comparator including input nodes coupled to two of the nodes;
a third comparator including input nodes coupled to two of the nodes;
a first delay circuit coupled to an output node of the first comparator;
a second delay circuit coupled to an output node of the second comparator;
a third delay circuit coupled to an output node of the third comparator; and
a clock recovery circuit to generate a clock signal, the clock signal including:
a first edge based on an edge of a first signal generated based on an earliest data transition among data transitions of signals received that the nodes;
a second edge based on an edge of a second signal, the second signal being a delayed version of the first signal; and
a finite state machine to provide a code to adjust a time delay of each of the first and second delay circuits.

11. The apparatus of claim 10, wherein each of the first and second delay circuits include a digital controlled delay line.

12. The apparatus of claim 10, wherein the first edge of the clock signal is a rising edge and the second edge of the clock signal is a falling edge.

13. The apparatus of claim 12, wherein the edge of the first signal is a rising edge, and the edge of the second signal is a rising edge.

14. An apparatus comprising:
nodes to receive signals based on D-PHY mode of Mobile Industry Processor Interface (MIPI) specification;
a first comparator including input nodes coupled to two of the nodes;
a second comparator including input nodes coupled to two of the nodes;
a third comparator including input nodes coupled to two of the nodes;
a first delay locked-loop coupled to an output node of the first comparator;
a second delay locked-loop coupled to an output node of the second comparator;
a third delay locked-loop coupled to an output node of the third comparator;
fifth, fourth, and sixth comparators coupled to fifth, fourth, and sixth delay locked-loop, respectively; and
a clock recovery circuit coupled to the first, second, third, fourth, fifth, and sixth delay locked-loops, wherein the fourth, fifth, and sixth comparators and the fourth, fifth, and sixth delay locked-loop are disabled during operations of the first, second, and third comparators and first, second, and third delay locked-loops.

15. The apparatus of claim 14, wherein:
the first delay locked-loop including first and second digital controlled delay lines coupled in series with each other;
the second delay locked-loop including first and second digital controlled delay lines coupled in series with each other; and
the third delay locked-loop including first and second digital controlled delay lines coupled in series with each other.

16. The apparatus of claim 14, wherein the clock recovery circuit includes a finite state machine to provide a code to control the first and second delay locked-loops.

17. The apparatus of claim 14, further comprising:
a multiplexor coupled output nodes of the first delay locked-loop; and
a data sampler coupled to an output node of the multiplexor.

18. An apparatus comprising:
a receiver to receive signals based on Mobile Industry Processor Interface (MIPI) specification;
a processor to process data information included in the signals; and
antenna coupled to the processor, the receiver including:
a first comparator including input nodes coupled to two of the nodes;
a second comparator including input nodes coupled to two of the nodes;
a third comparator including input nodes coupled to two of the nodes;
a first delay locked-loop coupled to an output node of the first comparator, the first delay locked-loop including first and second digital controlled delay lines coupled in series with each other;
a second delay locked-loop coupled to an output node of the second comparator, the second delay locked-loop including first and second digital controlled delay lines coupled in series with each other;
a third delay locked-loop coupled to an output node of the third comparator, the second delay locked-loop including first and second digital controlled delay lines coupled in series with each other; and
circuitry to provide a code to adjust a time delay of at least one of the first second, and third delay locked-loops.

19. An apparatus comprising:
a receiver to receive signals based on Mobile Industry Processor Interface (MIPI) specification;
a processor to process data information included in the signals; and
antenna coupled to the processor, the receiver including:
a first comparator including input nodes coupled to two of the nodes;
a second comparator including input nodes coupled to two of the nodes;
a third comparator including input nodes coupled to two of the nodes;
a first delay locked-loop coupled to an output node of the first comparator, the first delay locked-loop including first and second digital controlled delay lines coupled in series with each other;
a second delay locked-loop coupled to an output node of the second comparator, the second delay locked-loop including first and second digital controlled delay lines coupled in series with each other;
a third delay locked-loop coupled to an output node of the third comparator, the second delay locked-loop including first and second digital controlled delay lines coupled in series with each other;
a fourth comparator including input nodes coupled to two of the nodes;
a fifth comparator including input nodes coupled to two of the nodes;
a sixth comparator including input nodes coupled to two of the nodes;
a fourth delay locked-loop coupled to an output node of the fourth comparator, the fourth delay locked-loop including first and second digital controlled delay lines coupled in series with each other;
a fifth delay locked-loop coupled to an output node of the fifth comparator, the fifth delay locked-loop including first and second digital controlled delay lines coupled in series with each other; and
a sixth delay locked-loop coupled to an output node of the sixth comparator, the sixth delay locked-loop including first and second digital controlled delay lines coupled in series with each other.

* * * * *